(12) United States Patent
Claussen et al.

(10) Patent No.: US 8,108,003 B2
(45) Date of Patent: Jan. 31, 2012

(54) CONTROLLING BASE STATION ROUTER DEVICE DEFINITION CODES

(75) Inventors: Holger Claussen, Swindon (GB); Lester Tse Wee Ho, Swindon (GB); Hamid Reza Karimi, Swindon (GB); Louis Gwyn Samuel, Swindon (GB)

(73) Assignee: Alcatel Lucent, Paris (FR)

( * ) Notice: Subject to any disclaimer, the term of this patent is extended or adjusted under 35 U.S.C. 154(b) by 1698 days.

(21) Appl. No.: 11/371,636

(22) Filed: Mar. 9, 2006

(65) Prior Publication Data

US 2007/0213066 A1    Sep. 13, 2007

(51) Int. Cl.
*H04M 1/00* (2006.01)
*H04B 1/38* (2006.01)

(52) U.S. Cl. ........................ 455/561; 455/444
(58) Field of Classification Search .................. 455/444, 455/561

See application file for complete search history.

(56) References Cited

U.S. PATENT DOCUMENTS

| 5,561,841 | A  | * | 10/1996 | Markus | 455/446 |
| 6,438,379 | B1 | * | 8/2002 | Gitlin et al. | 455/449 |
| 7,397,777 | B1 | * | 7/2008 | Sudo et al. | 370/331 |
| 7,813,329 | B2 | * | 10/2010 | Mori et al. | 370/342 |
| 2005/0122259 | A1 | * | 6/2005 | Sairo et al. | 342/357.1 |
| 2007/0178901 | A1 | * | 8/2007 | Williams | 455/439 |

FOREIGN PATENT DOCUMENTS

EP     1 657 950 A2 *  5/2006

* cited by examiner

*Primary Examiner* — Tuan H Nguyen
(74) *Attorney, Agent, or Firm* — Carlson, Gaskey & Olds, P.C.

(57) ABSTRACT

A wireless communication system (20) allows for using base station router devices (30, 32) for in building communications using a mobile station (22). Automatically configuring a definition code such as primary scrambling codes or pseudo random noise offsets of the base station router devices (30, 32) facilitates minimizing or avoiding false handovers between a macrocell base station (24) and one of the base station router devices (30, 32). In a disclosed example, a controller (26) such as a radio network controller communicates with at least one of the base station router devices (30, 32) for automatically changing a definition code used by such a device to avoid correspondence between definition codes within a selected range.

15 Claims, 3 Drawing Sheets

CONTROLLING BASE STATION ROUTER DEVICE DEFINITION CODES

FIELD OF THE INVENTION

This invention generally relates to communications. More particularly, this invention relates to wireless communications.

DESCRIPTION OF THE RELATED ART

Wireless communication systems are well known and in widespread use. Most systems allow subscribers to use mobile stations to conduct voice communications. In the recent past, more features have become available such as data communications along with other enhanced capabilities of wireless communications systems. It has become desirable for many subscribers to be able to use their mobile station as a primary communication device. In many situations, it has not been possible to replace the line-based telephone system in a building because of an inability to achieve sufficient radio frequency communications from inside the building to wireless communication network equipment located outside. There are RF losses associated with signals trying to penetrate through walls, for example.

One proposal at expanding wireless communication capability is to provide signaling devices within buildings that allows an individual to use a mobile station in a more reliable manner whether the mobile station is inside or outside the building. For example, it has been proposed to use base station router devices within buildings for interfacing between a mobile station and a wireless communication network so that a subscriber achieves reliable communications within a building.

With a proliferation of such base station router devices, various challenges become apparent. One issue that may arise is false handover where a mobile station is handed over from a serving macrocell to an incorrect base station router device (e.g., a picocell home unit). A cell may be considered a macrocell, for example, if it is served by a base station and includes other base stations of limited coverage area within the region of the macrocell. Some such devices are referred to as base station router devices that essentially cover a picocell range within a macrocell (e.g., within a building).

In UMTS systems, primary scrambling codes are used for identifying different cells, for example. If the base station router devices each use a primary scrambling code and the same scrambling codes are reused within a geographic area (e.g., a macrocell), there is an increased possibility for false handover. In the case of CDMA systems, a pseudo random noise offset (PN offset) is used instead of a scrambling code. If several base station router devices within a geographic area use the same PN offset, the possibility for false handovers exist.

Any attempt to minimize such false handovers should be done with a minimum requirement for processing and signaling to avoid adding burden to the wireless communication system. For example, if a radio resource control layer of the system is required to address false handover situations, additional network signaling and delays in executing correct handovers will be introduced. This becomes especially true when there are large numbers of mobile stations regularly attempting false handovers.

There is a need for controlling base station router device identifiers to minimize or avoid false handovers. This invention addresses that need by providing a unique strategy for controlling the identifiers used for base station router devices.

SUMMARY OF THE INVENTION

An exemplary method of communicating includes automatically configuring a base station router device definition code so that it does not correspond to a definition code of another base station router device within a selected range.

By ensuring that base station router devices within a selected range of each other do not have corresponding definition codes, false handovers can be minimized or avoided entirely. In one example, the base station router device definition code comprises a primary scrambling code. In another example, the base station router device definition code comprises a PN offset.

One example includes determining when false handovers occur and then making a determination whether a base station router device definition code should be changed. Another example includes determining when a new base station router device is introduced and ensuring that the definition code for that device does not correspond to any devices within a selected range based upon information regarding nearby devices.

The various features and advantages of this invention will become apparent to those skilled in the art from the following detailed description. The drawings that accompany the detailed description can be briefly described as follows.

DETAILED DESCRIPTION

The following examples demonstrate how an embodiment of this invention provides a strategy for automatically configuring base station router device definition codes to minimize or avoid false handovers to such devices. By automatically configuring definition codes of base station router devices within a selected range of each other so that they do not match or otherwise correspond to each other, the disclosed examples efficiently manage network resources to allow the proliferation of in building wireless communication devices while avoiding the problems associated with false handovers.

Figure 1:
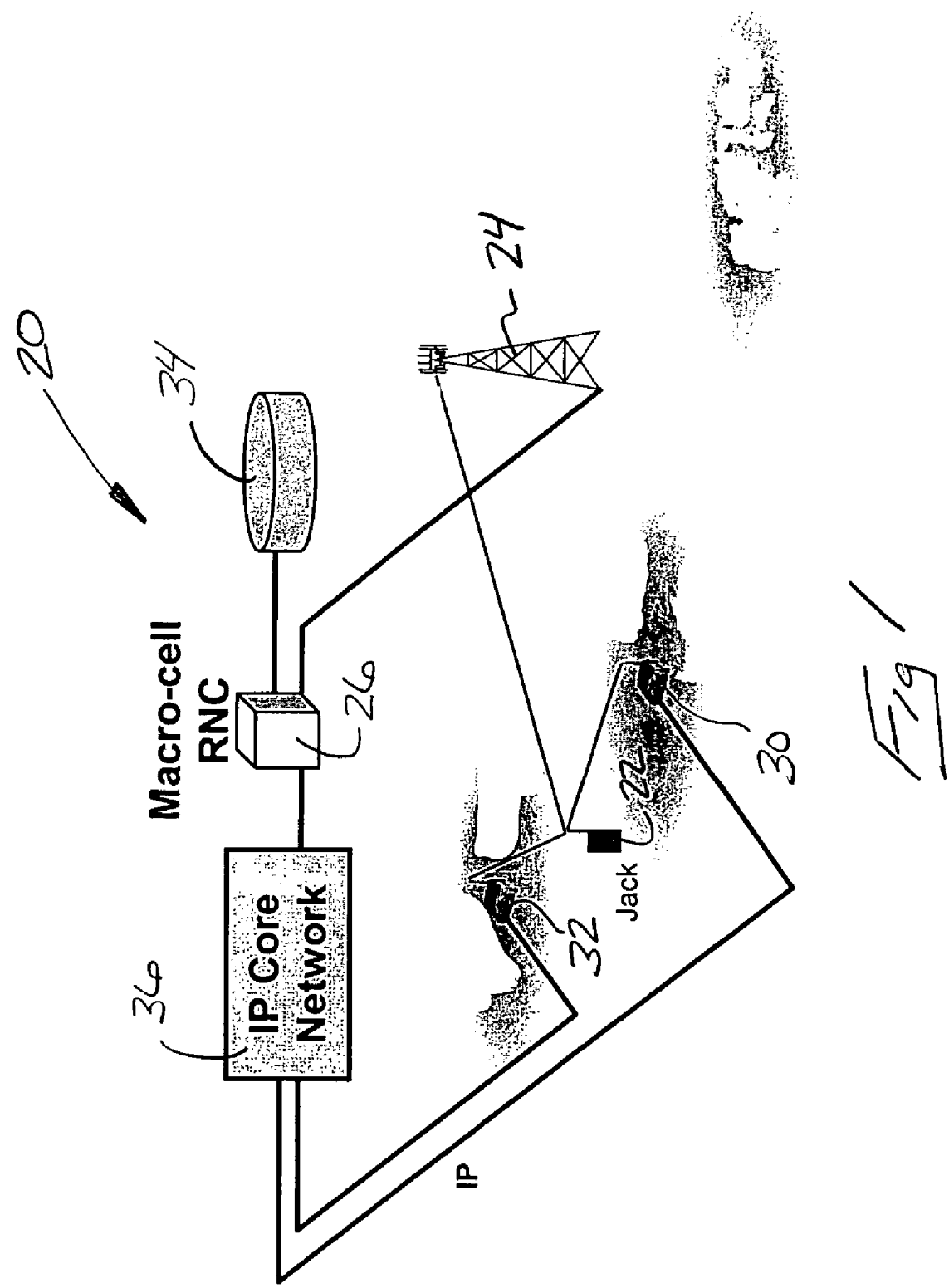
FIG. 1 schematically illustrates selected portions of the wireless communication system that is useful with an embodiment of this invention.

FIG. 1 schematically shows selected portions of a wireless communication system 20. In this example a mobile station 22 is communicating with a base station (BTS) 24. A controller 26, which in the illustrated example comprises a radio network controller (RNC), facilitates communications on behalf of the base station 24 and the mobile station 22 in a known manner.

In the illustrated example, the mobile station 22 is approaching a building (not illustrated) within which a base station router device (BSR) 30 is located. In one example, the BSR 30 is an in-home router device used by the subscriber owning the mobile station 22 to facilitate using the mobile station 22 from within the corresponding building (e.g., the subscriber's home). Example BSR's include home-unit base stations or home gateway base stations. Other pico-cell devices may be considered BSRs.

As the mobile station 22 approaches the BSR 30, the mobile station 22 ideally would hand over from communicating directly with the BTS 24 to communicating directly with the BSR 30. Handover processes are known and such a handover can include known techniques.

In the illustrated example, another BSR 32 is located geographically nearby the BSR 30. In one example, the BSR 32 is inside of a neighboring home close by the home of the mobile subscriber who owns the BSR 30.

If the BSR 32 and the BSR 30 have corresponding BSR definition codes (e.g., matching primary scrambling codes or PN offsets), it is possible for the mobile station 22 to attempt a handover to the BSR 32 as the mobile station 22 is approaching the BSR 30. For example, the mobile station 22 regularly reports to the controller 26 strong measurements of a strong common pilot channel associated with the BSR definition code used by the BSR 32. The mobile station 22 recognizes the BSR definition code as that for the BSR 30 even though the common pilot channel measurement is from the BSR 32. The controller 26 makes a positive handover decision based on appropriate thresholds and signals instructions to the mobile station 22 to perform a handover from the BTS 24. At some point during the handover process (e.g., upon decoding the BSR 32 broadcast channels), it becomes apparent that the common pilot channel was in fact associated with the BSR 32 and not the BSR 30. The handover in this situation is then terminated.

The controller 26 determines that the handover was terminated. In one example, the controller 26 determines that the terminated handover was a false handover. It then takes action to manage false handovers of this type.

The example of FIG. 1 includes a database 34 that includes information regarding any BSRs that are within the geographic region corresponding to control by the controller 26. The database 34 in one example includes at least a definition code of each such BSR (e.g., primary scrambling code or PN offset). Some examples include information regarding the location of each such BSR, which is useful in an example as described below. The location information may be information such as address, postal code, subscriber ID or other recognized information that provides location information. The controller 26 is capable of utilizing the database 34 to determine when BSRs within a selected range of each other have definition codes that correspond to each other. In one example, corresponding BSR definition codes match.

The example of FIG. 1 includes an IP core network 36 through which the controller 26 communicates directly with the BSRs 30 and 32. The IP core network 36 in one example is used for managing the definition codes of the BSRs.

Figure 2:
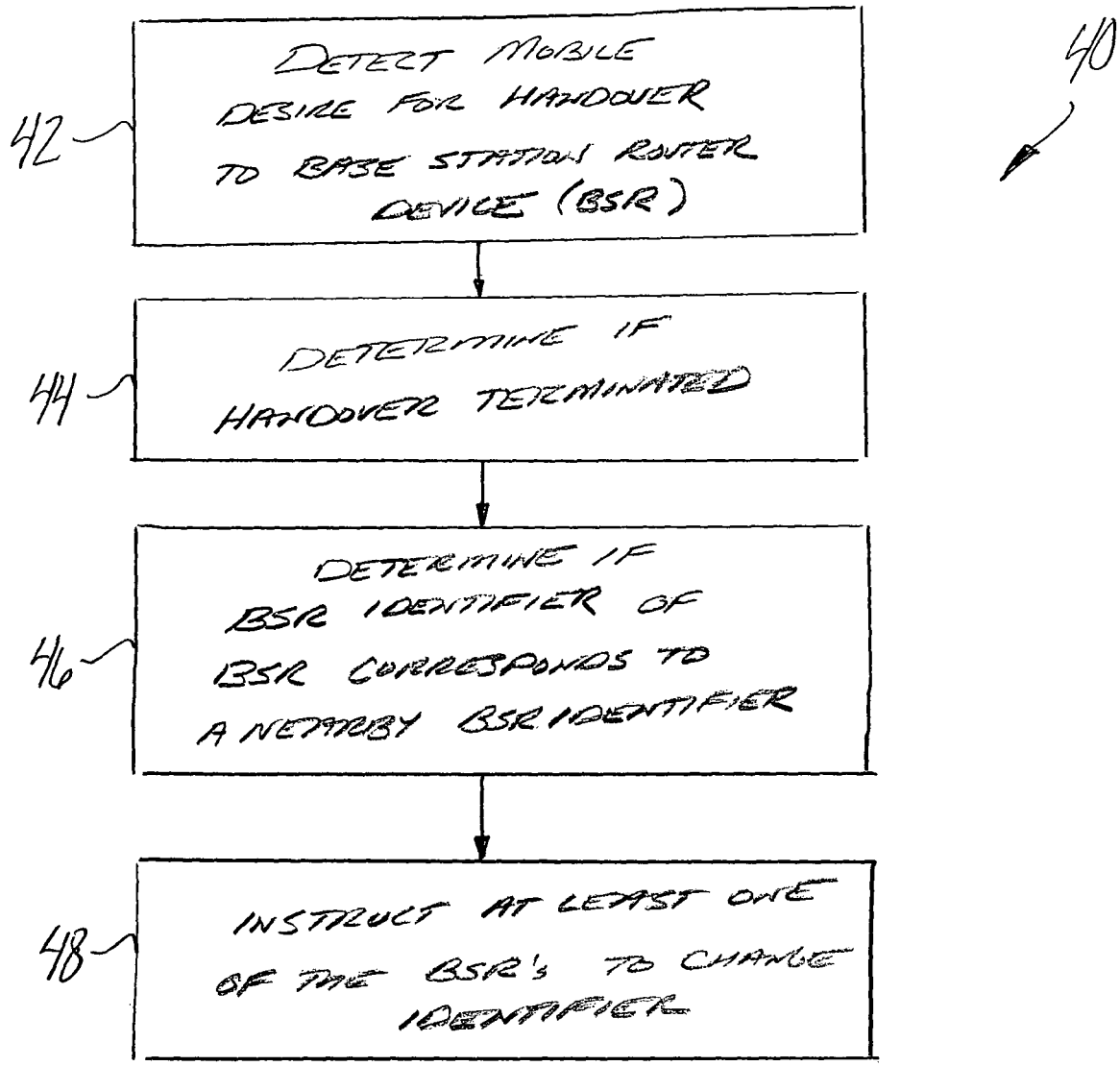
FIG. 2 is a flowchart diagram summarizing one example approach useful with an embodiment of this invention.

FIG. 2 includes a flowchart diagram 40 that summarizes one example approach for handling false handover situations. At 42, the controller 26 detects that the mobile station 22 desired the handover to the BSR 32 as described above. At 44, the controller 26 determines that the handover was terminated. To avoid future false handovers, if appropriate, the controller 26 then determines if the definition code of the BSR 32 corresponds to any nearby BSR definition codes. This is shown at 46 in FIG. 2.

In one example, the controller 26 instructs the mobile station 22 to continue measuring common pilot channel transmissions associated with the definition code used by the BSR 32. This will result in repetitive false handovers in many situations. Once a threshold number of false handovers is detected associated with the BSR 32, the controller 26 then takes action to mitigate or eliminate the possibility for future false handovers to the BSR 32.

When there is correspondence between at least two of the BSR definition codes, the controller 26 instructs at least one of the BSRs to change its definition code (e.g., primary scrambling code or PN offset). This is shown at 48 in FIG. 2.

In the example of FIG. 1, the controller 26 provides signals to the affected BSRs through the IP core network 36. The affected BSR or plurality of BSRs receives an instruction to change the definition code from one that is currently in use. In one example, each BSR receiving such an instruction automatically makes an appropriate change.

Making such a change can be defined by an algorithm at the controller 26. In such a situation, the controller 26 determines what the new definition code for the BSR should be and provides an appropriate indication of that in the communications over the IP core network 36. In another example, each BSR is equipped with an algorithm for changing the definition code responsive to an appropriate signal from the controller 26. In one example, the algorithm may be based upon measurements of downlink common pilot channel transmissions. Given this description, those skilled in the art will be able to develop appropriate algorithms and to decide where they will be implemented for changing BSR definition codes to achieve the results provided by the example discussed here.

Once a BSR changes the definition code, appropriate signaling is provided through the IP core network 36 to the controller 26 regarding the new definition code. The controller 26 then updates the database 34 to reflect the new information.

Figure 3:
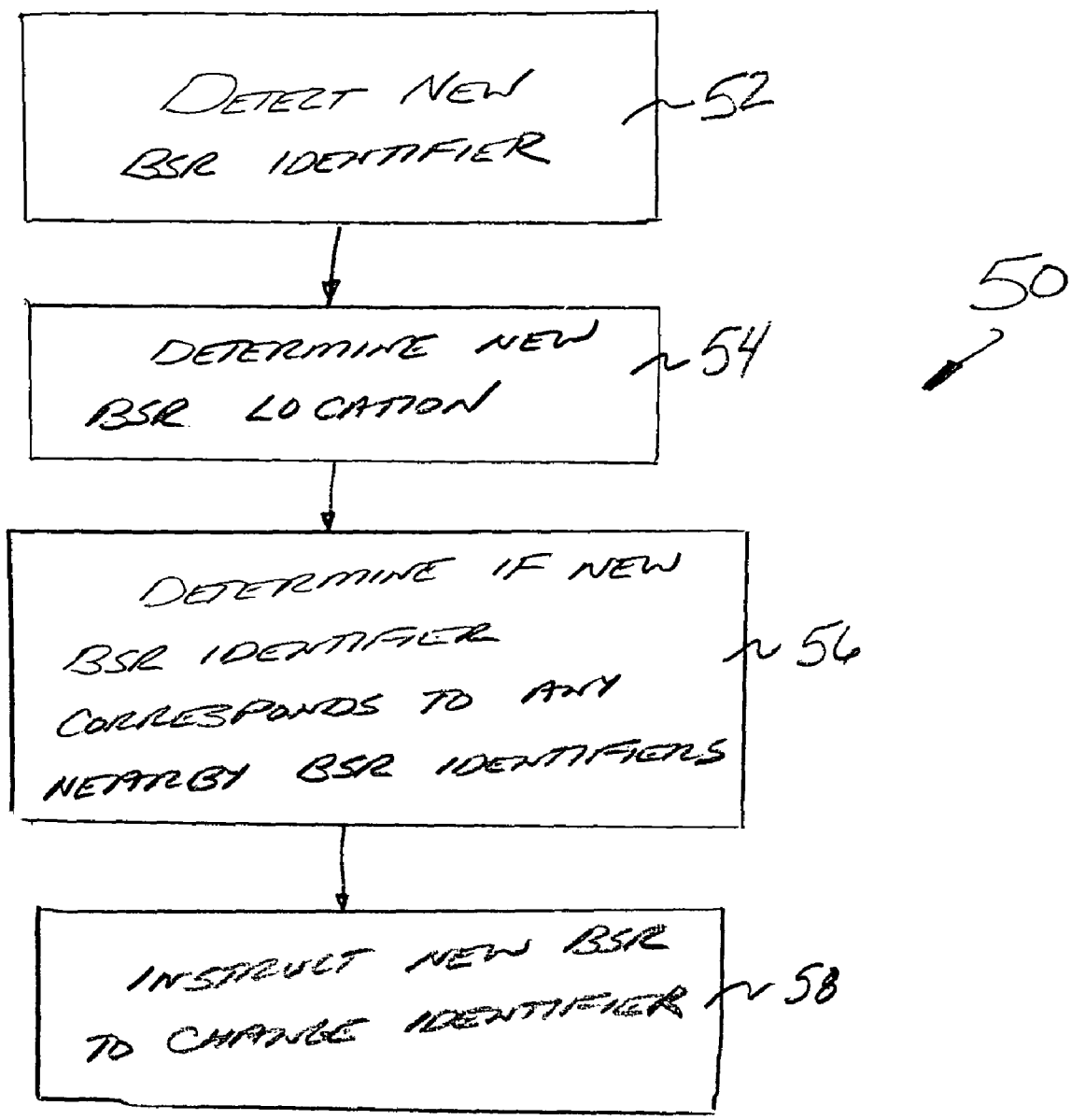
FIG. 3 is a flowchart diagram summarizing another example approach.

The example summarized in FIG. 2 can be considered a reactive approach to managing the possibility for false handovers. Another example includes a proactive approach and that is summarized in the flowchart of FIG. 3.

The flowchart 50 includes a step at 52 where a new BSR definition code is detected by the controller 26. This may occur when a new BSR is installed or activated and can be before the new BSR radiated signals, for example. The BSR provides appropriate signaling to the controller 26 through the IP core network 36 in one example. Upon detecting the new BSR definition code, the controller 26 determines whether the BSR definition code corresponds to any other BSR definition codes indicated in the database 34 within a selected range of the new BSR. The example of FIG. 3 includes determining the location of the new BSR at 54 and using that information for determining which entries in the database 34 may present a corresponding or matching definition code. The determination regarding correspondence between definition codes is shown at 56 in FIG. 3. If the new BSR definition code corresponds to one within a selected range of it, the controller 26 instructs the new BSR at 58 to change the definition code.

This example approach is useful where a BSR is set with an definition code (e.g., primary scrambling code or PN offset) prior to being initially activated for use in a building. The controller 26 can determine whether the initial definition code assigned to that BSR should be changed to minimize the possibility for false handovers. One advantage to this approach is that it allows for a provider of BSRs to use only a few definition codes during production because they can be adjusted upon installation by a subscriber.

There are various advantages to the disclosed example. One is that it requires no modifications to the mobile stations or macrocell base stations involved. It allows for readily detecting false handovers using existing network statistics. It minimizes signaling and processing within a wireless network so that there is not a significant increase in processing cost. At the same time, efficiencies with avoiding false handovers allows for more efficient completion of appropriate handovers.

In one example, the only addition to the infrastructure of the wireless communication network is an additional database to keep track of the BSR definition codes and an appropriate algorithm for assigning new definition codes, for example. Such an algorithm can be readily modified without interfering with other operations of the system. Another advantage of the disclosed examples is that they allow for efficient allocation and reuse of scrambling codes or PN offsets as BSR definition codes.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A method, comprising:
   automatically configuring a definition code of a base station router device to be distinguishable from a definition code of another base station router device within a selected range;
   determining whether the base station router device is involved in at least a selected number of false handovers; and
   changing the definition code if the selected number of false handovers is reached.

2. The method of claim 1, comprising
   determining a location of the base station router device; and
   setting the definition code to be distinguishable from any other known base station router devices within the selected range of the determined location.

3. The method of claim 2, comprising
   maintaining a database of definition codes for a plurality of base station router devices having known locations;
   using the database when setting the definition code.

4. The method of claim 2, comprising
   changing the definition code from a current code.

5. The method of claim 2, comprising
   detecting at least one signal from the base station router device associated with an initial use of the base station router device; and
   determining the location and setting the definition code responsive to the detected at least one signal.

6. The method of claim 1, comprising
   sending at least one signal from the base station router device that provides an indication of a current definition code; and
   receiving an indication whether to change the definition code from the current definition code.

7. The method of claim 1, comprising
   determining whether the definition code of the base station router device is the same as a definition code of another base station router device to which handover was desired during at least one of the selected number of false handovers; and
   changing the definition code of one of the base station router devices so that the definition codes are different.

8. The method of claim 1, comprising
   detecting a false handover;
   prompting a mobile station device to repeatedly monitor common pilot channel transmissions associated with the definition code until at least the selected number of false handovers occurs.

9. The method of claim 1, comprising
   communicating between the base station router device and a wireless communication system controller through an IP network.

10. The method of claim 1, wherein the definition code comprises one of a scrambling code or a pseudo random noise offset.

11. A communication system, comprising:
    a plurality of base station router devices; and
    at least one controller that determines whether any first ones of the plurality of base station router devices has the same definition code as any second ones of the plurality of base station router devices within a selected range and instructs at least one of the first one or the second one of the base station router devices to change its definition code, wherein the at least one controller determines whether any of the base station router devices has been involved in at least a selected number of false handovers before instructing at least a corresponding one of the base station router devices to change its definition code.

12. The system of claim 11, comprising
    a database containing indications of the plurality of base station router devices, a corresponding plurality of respective definition codes and a corresponding plurality of respective locations and wherein the at least one controller uses the database for determining whether to instruct any of the base station router devices to change its definition code.

13. A communication system, comprising:
    a plurality of base station router devices; and
    at least one controller that determines whether any first ones of the plurality of base station router devices has the same definition code as any second ones of the plurality of base station router devices within a selected range and instructs at least one of the first one or the second one of the base station router devices to change its definition code wherein the at least one controller detects an initial use of one of the base station router devices, determines a location of the one of the base station router devices and determines whether a current definition code of the one of the base station router devices corresponds to a definition code of any other base station router devices within the selected range of the determined location.

14. The system of claim 13, wherein the at least one controller communicates with the one of the base station router devices for changing the definition code of the one of the base station router device if the definition code corresponds to the definition code of any other base station router devices within the selected range of the determined location.

15. A base station router device, comprising
    a communication portion for communicating with at least one controller associated with a wireless communication system, the base station router device changing a current definition code of the base station router device responsive to the at least one controller having determined that the base station router device was involved in at least a selected number of false handovers and communicating an instruction to the base station router device for changing the definition code.

* * * * *